US011358350B1

(12) United States Patent
Hundley et al.

(10) Patent No.: US 11,358,350 B1
(45) Date of Patent: Jun. 14, 2022

(54) LIGHTWEIGHT SANDWICH STRUCTURES AND METHODS OF MANUFACTURING THE SAME

(71) Applicant: HRL LABORATORIES, LLC, Malibu, CA (US)

(72) Inventors: Jacob M. Hundley, Thousand Oaks, CA (US); Alicia J. Dias, Boston, MA (US); Eric C. Clough, Santa Monica, CA (US); Tobias A. Schaedler, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 945 days.

(21) Appl. No.: 15/967,037

(22) Filed: Apr. 30, 2018

Related U.S. Application Data

(60) Provisional application No. 62/527,773, filed on Jun. 30, 2017.

(51) Int. Cl.
B29C 70/68 (2006.01)
B29C 71/00 (2006.01)
B29C 33/38 (2006.01)
B32B 27/06 (2006.01)
B32B 27/38 (2006.01)
(Continued)

(52) U.S. Cl.
CPC ........ *B29C 70/682* (2013.01); *B29C 33/3842* (2013.01); *B29C 70/683* (2013.01); *B29C 70/685* (2013.01); *B29C 71/0009* (2013.01); *B32B 3/12* (2013.01); *B32B 27/06* (2013.01); *B32B 27/38* (2013.01); *B29K 2063/00* (2013.01); *B29K 2105/0881* (2013.01); *B29K 2307/04* (2013.01); *B32B 2250/03* (2013.01); *B32B 2250/40* (2013.01);
(Continued)

(58) Field of Classification Search
CPC . B29C 70/682; B29C 33/3842; B29C 70/683; B29C 70/685; B29C 71/0009
USPC .......................................................... 264/219
See application file for complete search history.

(56) References Cited

U.S. PATENT DOCUMENTS 6,713,008 B1 * 3/2004 Teeter .................. B29C 70/025
264/240
8,052,831 B2 * 11/2011 Polus ..................... B29C 70/44
156/285

(Continued)

OTHER PUBLICATIONS

Belhaj et al. ,"Dry fiber automated placement of carbon fibrous preforms" Composites: Part B 50 (2013) 107-111 (Year: 2011).*

(Continued)

*Primary Examiner* — Matthew J Daniels
*Assistant Examiner* — Hana C Page
(74) *Attorney, Agent, or Firm* — Lewis Roca

(57) ABSTRACT

A method of forming a sandwich structure including at least partially filling an open volume of an open cellular core with a sacrificial mold material, consolidating the sacrificial mold material to form a sacrificial mold, laying up a composite facesheet on each of at least two surfaces of the open cellular core, co-curing the composite facesheets by applying a consolidation temperature and a compaction pressure to the composite facesheets to form the sandwich structure, and removing the sacrificial mold. The compaction pressure is greater than a compressive strength of the open cellular core and less than a combined compressive strength of the open cellular core and the sacrificial mold.

15 Claims, 4 Drawing Sheets

(51) Int. Cl.
*B32B 3/12* (2006.01)
*B29K 63/00* (2006.01)
*B29K 307/04* (2006.01)
*B29K 105/08* (2006.01)

(52) U.S. Cl.
CPC ... *B32B 2260/021* (2013.01); *B32B 2260/046* (2013.01); *B32B 2262/106* (2013.01)

(56) References Cited

U.S. PATENT DOCUMENTS

| | | | |
|---|---|---|---|
| 10,632,687 B2* | 4/2020 | Wadsworth | F02K 1/72 |
| 2013/0014888 A1* | 1/2013 | Miller | B29C 33/0011 |
| | | | 156/247 |
| 2013/0143060 A1* | 6/2013 | Jacobsen | B29C 35/0894 |
| | | | 428/594 |

OTHER PUBLICATIONS

Department of Defense Handbook, Composite Materials Handbook:, vol. 2, Polymer Matrix Composites Materials Properties, (MIL-17), 529 pages, Jun. 17, 2002.

Lee et al., "Novel applications of composite structures to robots, machine tools and automobiles," Composite Structures 66, pp. 17-39, 2004.

Schultz et al., "Compression Behavior of Fluted-Core Composite Panels," AIAA Structures, Structural Dynamics and Materials Conference, Apr. 2011, 16 pages.

Wing et al., Evaluation of Out of Autoclave Composite Properties Manufactured From a Soluble Self-Pressurizing Tooling, SAMP Technical Conference, 2016, 9 pages.

Yuan et al., "Experimental Investigation on the Co-Cure Processing of Honeycomb Structure with Self-Adhesive Prepreg," Appl. Comps. Mater., 15:47-59, 2008.

* cited by examiner

LIGHTWEIGHT SANDWICH STRUCTURES AND METHODS OF MANUFACTURING THE SAME

CROSS-REFERENCE TO RELATED APPLICATION(S)

The present application claims priority to and the benefit of U.S. Provisional Application No. 62/527,773, filed Jun. 30, 2017, the entire content of which is incorporated herein by reference.

STATEMENT REGARDING FEDERALLY SPONSORED RESEARCH OR DEVELOPMENT

This invention was made with Government support under Contract No. NNC15CA16C awarded by NASA. The Government has certain rights in the invention.

FIELD

The present disclosure relates generally to sandwich structures and methods of manufacturing the same.

BACKGROUND

Sandwich structures including a pair of facesheets connected by a low density core are commonly employed in aircraft and spacecraft due to their increased flexural stiffness and buckling resistance compared to stiffened plates having an equivalent mass. In sandwich structures, the facesheets are configured to carry all in-plane loads and the core transmits shear loads and increases the effective moment of inertia of the sandwich structure.

In applications such as space launch vehicles it is desirable to reduce core mass and increase facesheet stiffness and strength. Commonly, these properties are achieved by utilizing an ultralight core material (e.g., having a density less than 0.15 grams per cubic centimeter) and fiber reinforced composite facesheets (e.g., carbon fiber epoxy). Ideally, these sandwich structures would be formed by co-curing the facesheets to the core by laying up polymer impregnated composite plies onto exposed surfaces of the core and consolidating the plies with the application of heat and pressure because co-curing can increase the specific strength and stiffness of the facesheets, eliminate parasitic adhesive mass in the facesheets, and reduce tolerance errors for complex assemblies.

However, related art sandwich structures with lightweight cores are not formed by co-curing because the pressure utilized to consolidate the facesheets during co-curing exceeds the relatively low compressive strength of the lightweight core. Accordingly, co-curing cannot be utilized with related art methodologies for forming sandwich structures without damaging the lightweight core. Accordingly, some related art sandwich structures with lightweight cores are formed by separately forming and consolidating the facesheets and then attaching the consolidated facesheets to the core, which increases the mass and cost of manufacturing the sandwich structure. Alternatively, related art sandwich structures may be formed by co-curing the facesheets by consolidating the facesheets under a reduced compaction pressure (e.g., a sub-optimal compaction pressure), which limits the performance of the facesheets to carry in-plane loads and increases the parasitic adhesive mass of the sandwich structure.

SUMMARY

The present disclosure is directed to various methods of manufacturing a sandwich structure. In one embodiment, the method includes at least partially filling an open volume of an open cellular core with a sacrificial mold material, consolidating the sacrificial mold material to form a sacrificial mold, laying up a composite facesheet on each of at least two surfaces of the open cellular core, co-curing the composite facesheets by applying a consolidation temperature and a compaction pressure to the composite facesheets to form the sandwich structure, and removing the sacrificial mold. The compaction pressure is greater than a compressive strength of the open cellular core and less than a combined compressive strength of the open cellular core and the sacrificial mold.

The method may also include placing the open cellular core in a chamber of a mold before at least partially filling the open volume with the sacrificial mold material.

The at least two surfaces of the open cellular core may be in direct contact with inner surfaces of the chamber.

The method may also include pressing the at least two surfaces of the open cellular core into at least one spacer positioned between the open cellular core and inner surfaces of the chamber. The at least one spacer masks the at least two surfaces of the open cellular core from contact with the sacrificial mold material. The material of the at least one spacer may be silicone, rubber, closed cell foam, a polymer film, or a combination thereof.

The consolidation temperature may be from about 23° C. to about 180° C.

The compaction pressure may be from about 0.1 MPa to about 12 MPa.

The method may also include applying a release agent to the open cellular core before the at least partially filling of the open volume with the sacrificial mold material, and masking the at least two surfaces of the open cellular core against exposure to the release agent.

The at least partially filling of the opening volume with the sacrificial mold material may be performed by pouring under gravity, filling under vacuum, filling under positive pressure, sifting powder, compaction of powder, or a combination thereof.

The sacrificial mold material may be of eutectic salt, plaster, polyethylene glycol (PEG), polyethylene oxide (PEO), ceramic spheres, plaster, wax, or a combination thereof.

Each of the at least two composite facesheets may include pre-impregnated fiber reinforced polymers.

Each of the at least two composite facesheets may include a dry fabric reinforcement layer and a liquid resin on the dry fabric reinforcement layer.

The removing of the sacrificial mold may be performed by burning the sacrificial mold, dissolving the sacrificial mold, etching the sacrificial mold, fracturing the sacrificial mold, evaporating the sacrificial mold, melting the sacrificial mold, or a combination thereof.

The open cellular core may include a series of struts arranged in a lattice structure. Each strut of the series of struts may have a solid cross-section or a hollow cross-section. Each strut of the series of struts may be a photopolymer waveguide.

The open cellular core may include foam.

The open cellular core may include a partially connected honeycomb structure or a grid architecture.

A method of forming a sandwich structure according to another embodiment of the present disclosure includes at least partially filling an open volume of an open cellular core with a sacrificial mold material, consolidating the sacrificial mold material to form a sacrificial mold, laying up a composite facesheet on each of at least two common surfaces of the open cellular core and the sacrificial mold, co-curing the composite facesheets by applying a consolidation temperature and a compaction pressure to the composite facesheets to form the composite sandwich structure, and removing the sacrificial mold. The open volume of the open cellular core extends along three orthogonal axes. The compaction pressure is greater than a compressive strength of the open cellular core and less than a combined compressive strength of the open cellular core and the sacrificial mold.

The present disclosure is also directed to various embodiments of a sandwich structure. In one embodiment, the sandwich structure includes an open cellular core defining an open volume, a sacrificial mold at least partially filling the open volume of the open cellular core, and at least two composite facesheets bonded to at least two surfaces of the open cellular core.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

FIGS. 1A-1H depict steps of a method of manufacturing a sandwich structure 100 including an open cellular core 101 and first and second facesheets 102, 103 coupled to the open cellular core 101 according to one embodiment of the present disclosure.

Figure 1A:
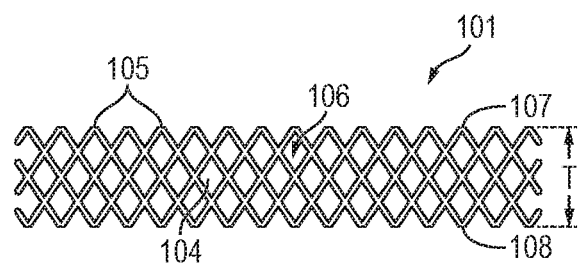
FIGS. 1A-1F illustrate steps of forming a sandwich structure without utilizing a spacer layer according to one embodiment of the present disclosure.

As illustrated in FIG. 1A, the method includes a step of obtaining or manufacturing the open cellular core 101. The open cellular core 101 defines an open volume (e.g., a porosity) 104. In one or more embodiments, the open volume 104 of the open cellular core 101 may extend laterally, longitudinally, and transversely through the open cellular core 101 (e.g., the open volume 104 may extend in a thickness direction, a length direction, and a width direction of the open cellular core 101). That is, in one or more embodiments, the open volume 104 of the open cellular core 101 is open along three orthogonal axes. In the illustrated embodiment, the open cellular core 101 includes a series of interconnected struts 105 arranged in a lattice structure 106 (e.g., a series of repeating unit cells or half unit cells). In one or more embodiments, the open cellular core 101 may include a foam, a grid, or a partially-connected honeycomb structure. In one or more embodiments in which the open cellular core 101 includes a series of interconnected struts 105 arranged in a lattice structure 106, the struts 105 may be solid or hollow. The open cellular core 101 may include any suitable material depending on the desired properties of the sandwich structure 100. For instance, in one or more embodiments, the open cellular core 101 may be made out of metal (e.g., aluminum, nickel, copper), silicon carbide, silicon oxycarbide, alumina, silicon carbonitrile, polymer (e.g., acrylate, methacrylate, thiol, epoxy, urethane, polyimide), ceramic, or any combination thereof. In one or more embodiments, the open cellular core 101 may have a thickness T from approximately (about) 0.5 mm to approximately (about) 50 mm. In one or more embodiments, the open cellular core 101 may have a density from approximately (about) 0.02 grams per cubic centimeter (g/cc) to approximately (about) 1 g/cc. In one or more embodiments, the open cellular core 101 may include hollow nickel struts 105 arranged in a lattice 106 structure having a density of approximately (about) 0.4 g/cc and a thickness T of approximately (about) 13 mm.

With continued reference to the embodiment illustrated in FIG. 1A, the method also includes a step of cleaning the open cellular core 101 (e.g., surfaces of the struts 105) to remove any contaminants from the surfaces of the open cellular core 101, such as particulates, dust, and/or oil. In the illustrated embodiment, the method also includes a step of applying a release agent (e.g., silicone, lecithin, wax, or combinations thereof) to at least a portion of the open cellular core 101. In one or more embodiments, the release agent may be applied to surfaces of the open cellular core 101 (e.g., surfaces of the struts 105) defining the open volume 104. The release agent is configured to promote or aid in removal of a sacrificial mold (described below in a subsequent step of the method) from the open volume 104 of the open cellular core 101. Additionally, in one or more embodiments, the method may include a step of masking one or more portions (e.g., opposing upper and lower surfaces 107, 108) of the open cellular core 101 before applying the release agent. Masking one or more portions of the open cellular core 101 is configured to prevent or protect these portions of the open cellular core 101 from being exposed to the release agent during the step of applying the release agent to the open cellular core 101. In one or more embodiments, the surfaces 107, 108 of the open cellular core 101 along which the first and second facesheets 102, 103 will be coupled to the open cellular core 101 during a subsequent step of the method described below may be masked against exposure to the release agent. Otherwise, application of release agent to the surfaces 107, 108 along which the facesheets 102, 103 will be coupled to the open cellular core 101 might weaken the connection between the facesheets 102, 103 and the open cellular core 101 (e.g., masking the upper and lower surfaces 107, 108 of the open cellular core 101 is configured to promote interfacial adhesion between the facesheets 102, 103 and the open cellular core 101).

Figure 1B:
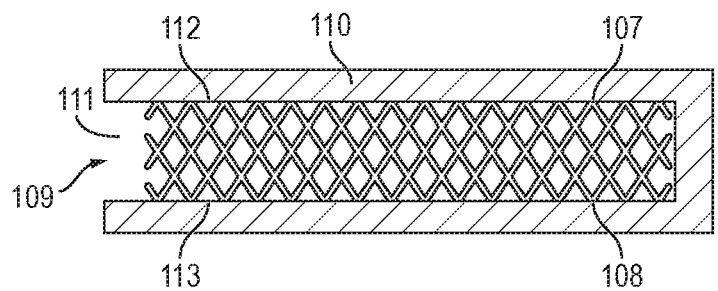

With reference now to the embodiment illustrated in FIG. 1B, the method includes a step of inserting the open cellular core 101 into a chamber or cavity 109 defined by a mold 110. In the illustrated embodiment, the mold 110 defines an inlet opening 111 through which sacrificial mold material 115 may be introduced into the chamber 109 in a subsequent step. Additionally, in one or more embodiments, the mold 110 may also define an outlet opening. In one or more embodiments, the mold 110 may be thermally insulated.

Figure 1C:
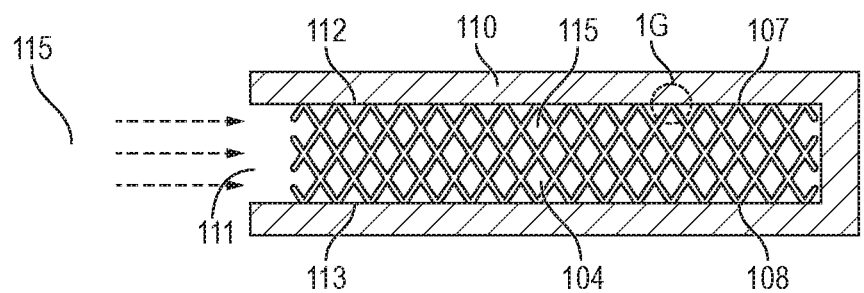

With reference now to the embodiment illustrated in FIG. 1C, the method includes a step of introducing the sacrificial mold material 115 into the open volume 104 of the open cellular core 101 and at least partially filling the open volume 104 of the open cellular core 101 with the sacrificial mold material 115 (e.g., infiltrating at least a portion of the open volume 104 of the open cellular core 101 with the sacrificial mold material 115). In one or more embodiments, the step of at least partially filling the open volume 104 of the open cellular core 101 may include completely or substantially completely filling the open volume 104 of the open cellular core 101 with the sacrificial mold material 115. In one or more embodiments, step of at least partially filling the open volume 104 of the open cellular core 101 may include inserting the sacrificial mold material 115 into the chamber 109 of the mold 110 through the inlet opening 111 and allowing the sacrificial mold material 115 to flow into the open volume 104 of the open cellular core 101. In one or more embodiments, the outlet opening of the mold 110 may be utilized to capture excess of the sacrificial mold material 115 introduced into the chamber 109 and the open volume 104 of the open cellular core 101, and/or the outlet opening may be utilized to capture entrapped air in the open volume 104 of the open cellular core 101. In one or more embodiments, the sacrificial mold material 115 may include eutectic salt, plaster, polyethylene glycol (PEG), polyethylene oxide (PEO), ceramic spheres, plaster, wax, or combinations thereof. In one or more embodiments, the sacrificial mold material 115 may be a powder mixture of ceramic spheres, plaster, and PEG. In one or more embodiments, the chamber 109 of the mold 110 may be thermally insulated depending on the type of sacrificial mold material 115 utilized (e.g., the chamber 109 of the mold 110 may be thermally insulated when the sacrificial mold material 115 is molten eutectic salt).

In one or more embodiments, the method may include a step of completely or substantially completely filling the open volume 104 of the open cellular core 101 with the sacrificial mold material 115. In one or more embodiments, the method may include a step of completely or substantially completely filling the chamber 109 of the mold 110 with the sacrificial mold material 115. In this manner, the chamber 109 of the mold 110 enables integration of the sacrificial mold material 115 with the open cellular core 101 and defines the geometry of the combined open cellular core 101 and the sacrificial mold material 115 (e.g., the chamber 109 of the mold 110 defines the geometry of the parallel core-sacrificial mold material combination). In one or more embodiments, the step of introducing the sacrificial mold material 115 into the open volume of the open cellular core 101 may be performed in any suitable manner depending, for instance, on the type of sacrificial mold material 115 utilized and/or the phase of the sacrificial mold material 115 (e.g., liquid or powder). In one or more embodiments, the step of introducing the sacrificial mold material 115 into the open volume 104 of the open cellular core 101 may include pouring under gravity, filling under vacuum, filling under positive pressure, sifting and/or compaction of powder, or one or more combinations thereof.

The chamber 109 of the mold 110 is at least as large as the bulk volume of the open cellular core 101. In the embodiment illustrated in FIGS. 1A-1H, the chamber 109 is sized such that the upper and lower surfaces 107, 108 of the open cellular core 101 along which the facesheets 102, 103 will be coupled to the open cellular core 101 are in direct contact with inner surfaces (e.g., inwardly facing surfaces) 112, 113, respectively, of the mold 110.

Figure 1D:
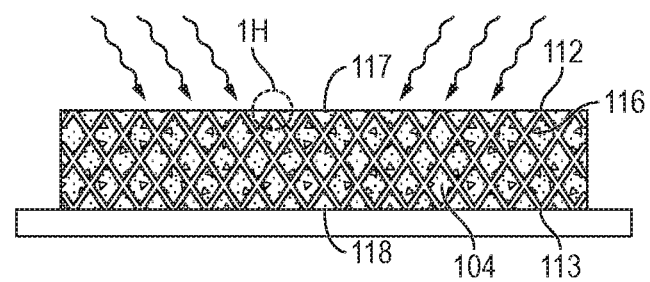
Figure 1E:
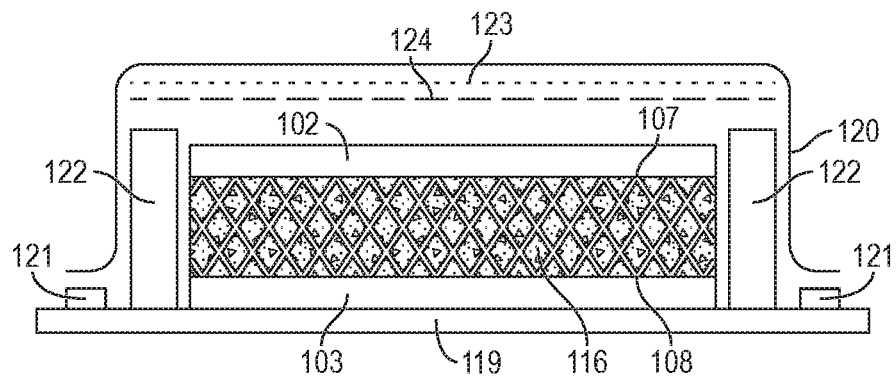
Figure 1F:
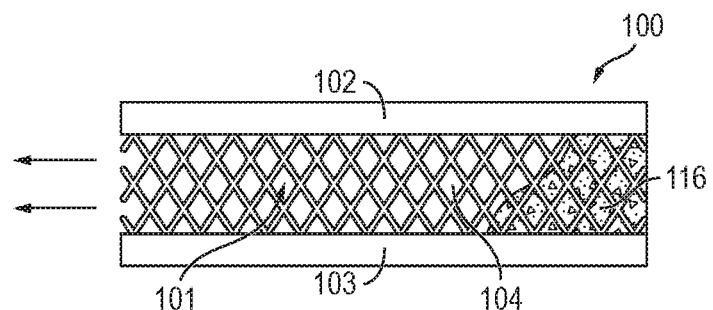
Figure 1G:
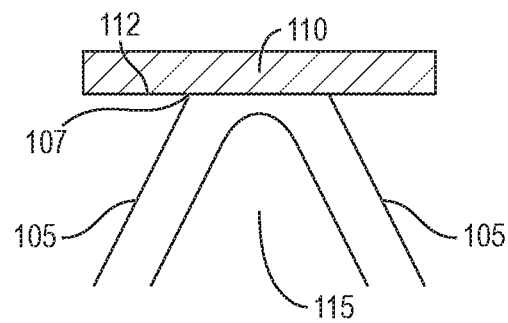
FIGS. 1G-1H are detail views illustrating steps of forming the sandwich structure without utilizing the spacer layer according to the embodiment illustrated in FIGS. 1A-1F.
Figure 1H:
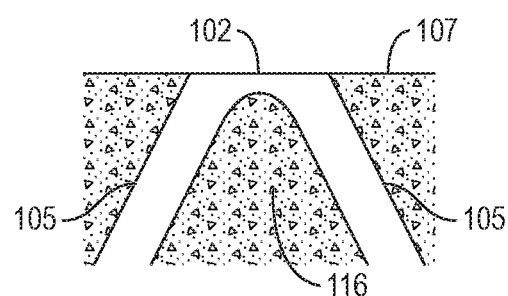
Figure 2A:
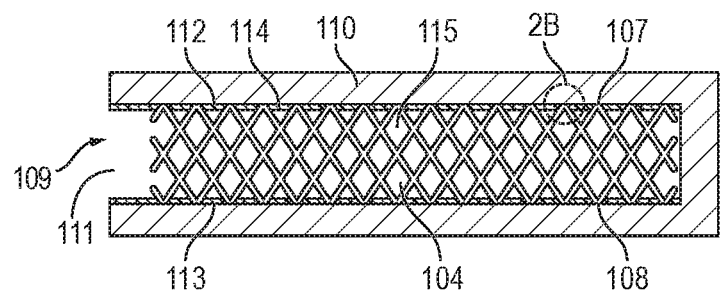
FIGS. 2A-2D illustrate steps of forming a sandwich structure utilizing a spacer layer according to one embodiment of the present disclosure.
Figure 2B:
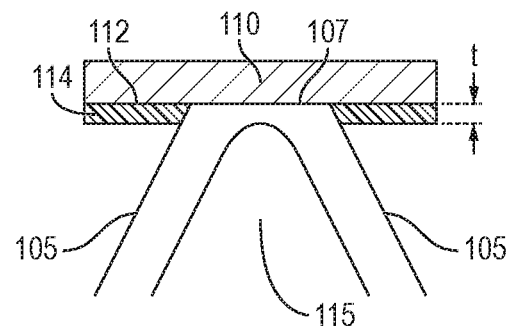
Figure 2C:
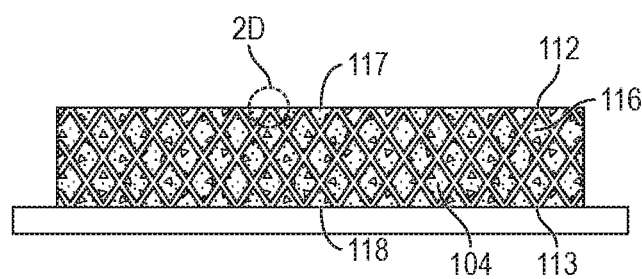
Figure 2D:
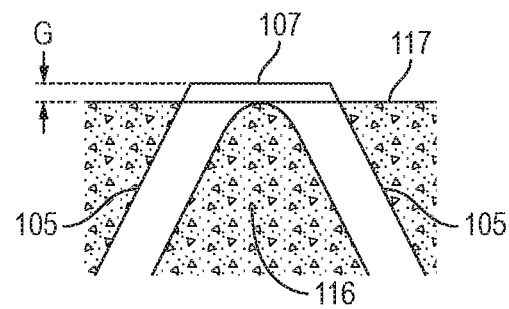

With reference now to the embodiment illustrated in FIGS. 1D and 1H, after the step of at least partially filling the open volume 104 of the open cellular core 101 with the sacrificial mold material 115, the method includes a step of consolidating the sacrificial mold material 115 to solidify the sacrificial mold material 115 into a solid sacrificial mold 116. The solid sacrificial mold 116, formed by the step of consolidating the sacrificial mold material 115, is configured to increase the compressive strength of the open cellular core 101 (e.g., the compressive strength of the combined solid sacrificial mold 116 and the open cellular core 101 exceeds the compressive strength of the open cellular core 101 alone). In one or more embodiments, the step of consolidating the sacrificial mold material 115 may be performed in any suitable manner depending, for instance, on the type of sacrificial mold material 115 utilized and/or the phase of the sacrificial mold material 115 (e.g., liquid or powder). In one or more embodiments, the step of consolidating the sacrificial mold material 115 may include curing (e.g., heating), solidification (e.g., cooling), compaction (e.g., sintering), and/or evaporation of a liquid (e.g., a solvent) in the sacrificial mold material 115. Following the step of consolidating the sacrificial mold material 115, the combined sacrificial mold 116 and the open cellular core 101 may be removed from the chamber 109 of the mold 110.

In one or more embodiments in which the sacrificial mold 116 is porous, the method may include a step of applying a sealant on surfaces (e.g., upper and lower surfaces 117, 118) of the sacrificial mold 116 along which the composite facesheets 102, 103, respectively, will be laid up in a subsequent step (e.g., a sealant may be applied to the upper and lower surfaces 117, 118 of the sacrificial mold 116 that will interface with (e.g., contact) the composite facesheets 102, 103, respectively). The sealant is configured to prevent or inhibit the infiltration of excess adhesive into the porous sacrificial mold 116 during a subsequent step of co-curing composite facesheets 102, 103 to the open cellular core 101, and the inhibition of adhesive into the porous sacrificial mold 116 is configured to aid in the removal of the sacrificial mold 116 from the open volume 104 of the open cellular core 101 during a subsequent step of the method described below. Additionally, in one or more embodiments, the method may include a step of applying a release agent on the surfaces 117, 118 of the sacrificial mold 116 along which the composite facesheets 102, 103 will be laid up in a subsequent step (e.g., a release agent may be applied to the surfaces 117, 118 of the sacrificial mold 116 that will interface with (e.g., contact) the composite facesheets 102, 103, respectively). The release agent is configured to aid in the removal of the sacrificial mold 116 from the open volume 104 of the open cellular core 101 during a subsequent step of the method described below. In one or more embodiments, the upper and lower surfaces 107, 108 of the open cellular core 101, along which the composite facesheets 102, 103 will be attached, may be masked against exposure to the sealant and/or the release agent applied to the sacrificial mold 116, which is configured to promote a robust bond between the composite facesheets 102, 103 and the open cellular core 101.

With reference now to the embodiment illustrated in FIG. 1E, the method also includes a step of laying up the composite facesheets 102, 103 (e.g. composite plies) on at least two surfaces (e.g., the opposing upper and lower surfaces 107, 108) of the open cellular core 101. In the illustrated embodiment, the sacrificial mold 116 is in parallel with the open cellular core 101 and is in series with the composite facesheets 102, 103 on the surfaces 107, 108 of the open cellular core 101. In one or more embodiments, the composite facesheets 102, 103 may be pre-impregnated fiber-reinforced polymer plies. In one or more embodiments, the composite facesheets 102, 103 may be dry fabric reinforcement plies onto which a liquid resin is deposited. In one or more embodiments, each of the composite facesheets 102, 103 may have a thickness from approximately (about) 0.1 mm to approximately (about) 13 mm. In one or more embodiments, the composite facesheets 102, 103 may include any suitable fiber reinforcement material, such as carbon, glass, alumina, silicon carbide, boron, aramid, polyethylene, or any combination or combinations thereof. In one or more embodiments, the composite facesheets 102, 103 may include a matrix material, such as epoxy, silicone, urethane, cyanate ester, polyimide, bismaleimide, acrylate, carbosilane, siloxane, and/or sequisiloxane. In one or more embodiments, the composite facesheets 102, 103 may include a fiber reinforcement ply having continuous unidirectional fibers, woven fibers, knit fibers, braided fibers, discontinuous chopped fibers, whiskers, platelets, and/or particulates. In one or more embodiments, each of the facesheets 102, 103 may be an approximately (about) 1 mm thick unidirectional carbon fiber reinforced epoxy composite facesheet with a quasi-isotropic layup.

With continued reference to the embodiment illustrated in FIG. 1E, after the step of laying up the composite facesheets 102, 103 on the surfaces 107, 108 of the open cellular core 101, the method includes a step of co-curing the composite facesheets 102, 103 onto the surfaces 107, 108 of the open cellular core 101. The step of co-curing the composite facesheets 102, 103 onto the surfaces 107, 108 of the open cellular core 101 includes consolidating the composite facesheets 102, 103. In one or more embodiments, the step of consolidating the composite facesheets 102, 103 includes applying a consolidation temperature and a compaction pressure to the composite facesheets 102, 103. In one or more embodiments, the consolidation temperate applied to the composite facesheets 102, 103 is from approximately (about) 23° C. to approximately (about) 180° C. In one or more embodiments, the consolidation temperature may be greater than approximately (about) 180° C. In one or more embodiments, the consolidation temperature may be selected depending on the type of matrix material in the composite facesheets 102, 103 (e.g., a consolidation temperature greater than 180° C. may be utilized in the step of consolidating the composite facesheets 102, 103 when the matrix material is a high temperature polymer, such as bismaleimides and polyimides). In one or more embodiments, the compaction pressure applied during the step of consolidating the composite facesheets 102, 103 may be applied by differential atmospheric pressure (e.g., a vacuum bag), hydrostatic pressure (e.g., a pressurized bladder), a platen press, and/or an autoclave. In one or more embodiments, the step of consolidating the composite facesheets 102, 103 may include applying a consolidation temperature of approximately (about) 177° C. under vacuum, and applying a compaction pressure of approximately (about) 1.4 MPa with a heated platen press to the composite facesheets 102, 103. In the illustrated embodiment, the step of consolidating the composite facesheets 102, 103 includes placing the open cellular core 101, the sacrificial mold 116, and the composite facesheets 102, 103 onto a caul plate 119, and covering the open cellular core, the sacrificial mold 116, and the composite facesheets 102, 103 with a vacuum bag 120 that is sealed to the caul plate 119 with vacuum sealant 121. Additionally, in the illustrated embodiment, the system for consolidating the composite facesheets 102, 103 on the surfaces 107, 108 of the open cellular core 101 includes a pair of rigid hard stops 122 on opposite sides of the open cellular core 101 configured to control the compaction pressure applied to the composite facesheets 102, 103. In the illustrated embodiment, the system for consolidating the composite facesheets 102, 103 on the surfaces 107, 108 of the open cellular core 101 also includes a breather layer 123 and a peel ply 124 on the upper composite facesheet 102 configured to facilitate removal of the vacuum bag 120 after the step of consolidating the composite facesheets 102, 103.

In one or more embodiments, the compaction pressure applied during the step of consolidating the composite facesheets 102, 103 may be from approximately (about) 0.1 MPa to approximately (about) 12 MPa. In one or more embodiments, the compaction pressure exceeds the compressive strength of the open cellular core 101, but the compressive strength of the combined sacrificial mold 116 and the open cellular core 101 exceeds the compaction pressure. In this manner, the sacrificial mold 116 is configured to increase the compaction pressure that may be applied to consolidate the composite facesheets 102, 103 compared to a related art process in which the open cellular core 101 is not reinforced by a sacrificial mold.

Applying the compaction pressure during the step of consolidating the composite facesheets 102, 103 is configured to press excess resin out of the composite facesheets 102, 103 and thereby increase the fiber volume fraction of the composite facesheets 102, 103. In one or more embodiments, the fiber volume fraction of the composite facesheets 102, 103 may be increased to at least approximately (about) 65% following the step of consolidating the composite facesheets 102, 103. Additionally, in one or more embodiments, the excess resin that is pressed from the composite facesheets 102, 103 by applying the compaction pressure may flow to the interfaces between the open cellular core 101 and the composite facesheets 102, 103 and thereby bond the composite facesheets 102, 103 to the surfaces 107, 108 of the open cellular core 101. Accordingly, the excess resin that is pressed from the composite facesheets 102, 103 and bonds the composite facesheets 102, 103 to the surfaces 107, 108 of the open cellular core 101 saves mass that would otherwise have to be applied to the interfaces between composite facesheets 102, 103 and the open cellular core 101 if the composite facesheets 102, 103 and the open cellular core 101 were separately formed and subsequently adhered together. In this manner, the step of co-curing the composite facesheets 102, 103 to the surfaces 107, 108 of the open cellular core 101 by applying a compaction pressure to the composite facesheets 102, 103 reduces the parasitic adhesive mass of the sandwich structure 100 compared to related art sandwich structures that are not formed by co-curing. Additionally, co-curing the composite facesheets 102, 103 to the open cellular core 101 by applying a compaction pressure to the composite facesheets 102, 103 is configured to reduce tolerance errors for sandwich structures 100 having complex geometries. For instance, during the step of co-curing the composite facesheets 102, 103 to the open cellular core 101 by applying the compaction pressure, the composite facesheets 102, 103 conform to the surfaces 107, 108 of the open cellular core 101 because the composite facesheets 102, 103 are still in a pliable (e.g., pre-cured) state, which enables complex geometries (e.g., curved facesheets) to be formed in a single step. In contrast, related art methods of forming a sandwich structure with complex geometry requires forming the composite facesheets and the core separately with the desired geometry (e.g., curvature). Forming the composite facesheets and the core separately requires additional tooling and increases the chance of assembly misalignment because the composite facesheets are fully cured before being attached to the core and therefore cannot conform to the core during processing.

With reference now to the embodiment illustrated in FIG. 1F, the method also includes a step of removing the sacrificial mold 116 from the open volume 104 of the open cellular core 101. In one or more embodiments, the process utilized during the step of removing the sacrificial mold 116 may depend, for instance, on the type of sacrificial mold material 115 and/or the process utilized during the step of consolidating the sacrificial mold material 115. For instance, in one or more embodiments, the step of removing the sacrificial mold 116 may be performed by dissolution of the sacrificial mold 116 in water or a solvent, etching the sacrificial mold 116 in an acidic or basic bath, melting the sacrificial mold 116, and/or vaporization or combustion of the sacrificial mold 116 at a temperature greater than the consolidation temperature. In one or more embodiments, the sacrificial mold 116 may be removed utilizing heated (e.g., 60° C.) pressurized water. Following the step of removing the sacrificial mold 116, the open volume 104 defined by the open cellular core 101 of the sandwich structure 100 is free or substantially free of the sacrificial mold 116.

In an alternate embodiment illustrated in FIGS. 2A-2D, one or more spacer layers 114 may be introduced in the chamber 109 between the upper and lower surfaces 107, 108 of the open cellular core 101 and the inner surfaces 112, 113 of the chamber 109 (e.g., one or more spacer layers 114 may be inserted into the chamber 109 before inserting the open cellular core 101 into the chamber 109, or the one or more spacer layers 114 may be applied to the upper surface 107 and/or the lower surface 108 of the open cellular core 101 before inserting the open cellular core 101 into the chamber 109 of the mold 110). In one or more embodiments, the surfaces 107, 108 of the open cellular core 101 along which the facesheets 102, 103 will be attached are pressed into the one or more spacer layers 114, thereby deforming or penetrating the one or more spacer layers 114 (e.g., the surfaces 107, 108 of the open cellular core 101 may be pressed into the one or more spacer layers 114 during the step of inserting the open cellular core 101 into the chamber 109 of the mold 110). In one or more embodiments, the material of the one or more spacer layers 114 may include silicone, rubber (e.g., buna rubber), closed cell foam, and/or a polymer film (e.g., polyethylene terephthalate (PET) film). In one or more embodiments, each of the one or more spacer layers 114 may have a thickness t from approximately (about) 0.05 mm to approximately (about) 3.5 mm. In one or more embodiments, the one or more spacer layers 114 may have a thickness t of approximately (about) 1.6 mm. In one or more embodiments, the method may include a step of pressing each of the surfaces 107, 108 of the open cellular core 101 along which the facesheets 102, 103 will be attached into the one or more spacer layers 114. In one or more embodiments, fewer than all of the surfaces 107, 108 of the open cellular core 101 along which the facesheets 102, 103 will be attached may be pressed into the one or more spacer layers 114.

In one or more embodiments in which the surfaces 107, 108 of the open cellular core 101 are in direct contact with the inner surfaces (e.g., the inwardly facing surfaces) 112, 113, respectively, of the mold 110 (embodiment illustrated in FIGS. 1A-1H) when the open cellular core 101 is inserted into the chamber 109 of the mold 110, the upper and lower surfaces 107, 108 of the open cellular core 101 are coextensive or substantially coextensive (e.g., co-planar or substantially co-planar) with the upper and lower surfaces 117, 118, respectively, of the sacrificial mold 116 (see FIG. 1H). That is, the open cellular core 101 and the sacrificial mold 116 occupying the open volume 104 of the open cellular core 101 share a continuous, common outer mold line (e.g., continuous, common outer surfaces) following the step of at least partially filling the open volume 104 with the sacrificial mold material 115 and consolidating the sacrificial mold material 115 into the sacrificial mold 116. Accordingly, in one or more embodiments, the composite facesheets 102, 103 may be laid up and co-cured on the common surfaces (e.g., the shared surfaces) 107, 108, 117, 118 of the open cellular core 101 and the sacrificial mold 116.

In one or more embodiments in which the surfaces 107, 108 of the open cellular core 101 are pressed into the one or more spacers 114 (embodiment illustrated in FIGS. 2A-2D) when the open cellular core 101 is inserted into the chamber 109 of the mold 110, the one or more spacers 114 mask off the surfaces 107, 108 of the open cellular core 101 such that the sacrificial mold material 115 does not contact the surfaces 107, 108 of the open cellular core 101 when the sacrificial mold material 115 is inserted into the open volume 104 of the open cellular core 101. Accordingly, in one or more embodiments, the one or more spacers 114 create a discontinuous, offset interface (e.g., a gap G in FIG. 2D) between the surfaces 107, 108 of the open cellular core 101 and surfaces 117, 118, respectively, of the sacrificial mold 116. This discontinuous, offset interface between the surfaces 107, 108 of the open cellular core 101 and the surfaces 117, 118 of the sacrificial mold 116 allows the excess resin pressed from the composite facesheets 102, 103 during the step of consolidating the composite facesheets 102, 103 to flow (e.g., wick) into the portions of the open cellular core 101 unoccupied by the sacrificial mold 116 and thereby form a finite thickness adhesive interface between the composite facesheets 102, 103 and the surfaces 107, 108 of the open cellular core 101.

Figure 3:
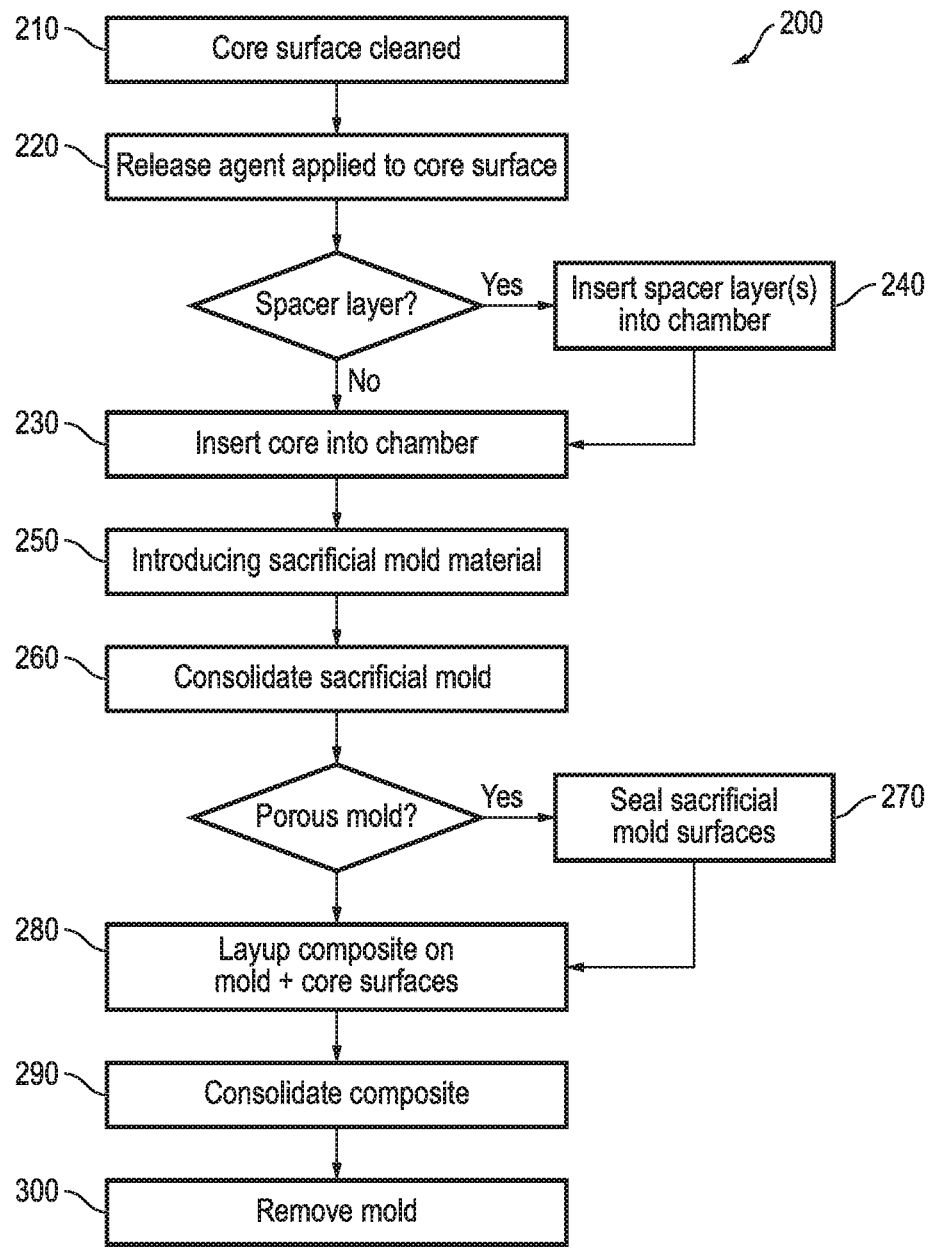
FIG. 3 is a flowchart illustrating steps of forming a sandwich structure according to one embodiment of the present disclosure.

FIG. 3 is a flowchart illustrating steps of a method 200 of forming a sandwich structure including an open cellular core between two composite facesheets according to one embodiment of the present disclosure. In the embodiment illustrated in FIG. 3, the method 200 includes a step 210 of cleaning an open cellular core defining an open volume to remove any contaminants from surfaces of the open cellular core. The open cellular core may have any suitable configuration described above, such as a series of hollow or solid interconnected struts arranged in a lattice structure, a foam, a grid, or a partially-connected honeycomb structure.

In the illustrated embodiment, the method 200 includes a step 220 of applying a release agent (e.g., silicone, lecithin, wax, or combinations thereof) to at least a portion of the open cellular core (e.g., surfaces of the open cellular core defining the open volume). The release agent is configured to promote or aid in removal of a sacrificial mold (formed during a subsequent step) from the open volume of the open cellular core. Additionally, in one or more embodiments, the method 200 may also include a step of masking surfaces (e.g., upper and lower surfaces) of the open cellular core against exposure to the release agent, which is configured to promote interfacial adhesion between the open cellular core and facesheets applied to these surfaces of the open cellular core during a subsequent step.

With continued reference to FIG. 3, the method 200 also includes a step 230 of inserting the open cellular core into a chamber of a mold. In one or more embodiments, the surfaces of the open cellular core along which the facesheets will be coupled to the open cellular core are in direct contact with inner surfaces (e.g., inwardly facing surfaces) of the mold. In one or more embodiments, the method 200 may include a step 240 of inserting one or more spacer layers into the chamber before the step 230 of inserting the open cellular core into the chamber, or the method may include a step of applying the one or more spacer layers to the surfaces of the open cellular core before the step 230 of inserting the open cellular core into the chamber of the mold.

The method 200 also includes a step 250 of introducing a sacrificial mold material (115 in FIGS. 1C, 1G, and 2B) (e.g., eutectic salt, plaster, PEG, PEO, ceramic spheres, plaster, wax, or combinations thereof) into the open volume of the open cellular structure and at least partially filling the open volume of the open cellular core with the sacrificial mold material 115. The step 250 of introducing the sacrificial mold material into the open volume of the open cellular core may be performed in any suitable manner, such as pouring under gravity, filling under vacuum, filling under positive pressure, sifting and compaction of powder, or combinations thereof.

The method 200 also includes a step 260 of consolidating the sacrificial mold material 115 to solidify the sacrificial mold material 115 into a solid sacrificial mold (116 in FIGS. 1D, 1H, 2C, and 2D). The step 260 of consolidating the sacrificial mold material 115 may be performed in any suitable manner depending, for instance, on the type of sacrificial mold material utilized and/or the phase of the sacrificial mold material 115 (e.g., liquid or powder), such as curing (e.g., heating), solidification (e.g., cooling), compaction (e.g., sintering), and/or evaporation of a liquid (e.g., a solvent) in the sacrificial mold material 115.

In one or more embodiments in which the sacrificial mold 116 is porous, the method 200 may include a step 270 of applying a sealant on surfaces of the sacrificial mold 116 to prevent or inhibit the infiltration of excess adhesive into the porous sacrificial mold 116 during a subsequent step of co-curing composite facesheets to the open cellular core, which is configured to aid in the removal of the sacrificial mold 116 during a subsequent step of the method described below.

In the illustrated embodiment, the method 200 also includes a step 280 of laying up composite facesheets on at least two surfaces (e.g., two opposing surfaces) of the open cellular structure. The composite facesheets may have any configuration described above, such as pre-impregnated fiber-reinforced polymer plies or dry fabric reinforcement plies onto which a liquid resin is deposited.

In the illustrated embodiment, the method 200 also includes a step 290 of co-curing the composite facesheets onto the surfaces (e.g., the upper and lower surfaces) of the open cellular core. The step 290 of co-curing the composite facesheets onto the surfaces of the open cellular core includes consolidating the composite facesheets by applying a consolidation temperature (e.g., approximately (about) 23° C. to approximately (about) 180° C.) and a compaction pressure (e.g., approximately (about) 0.1 MPa to approximately (about) 12 MPa) to the composite facesheets. The compaction pressure applied may be applied in any suitable manner, such as by differential atmospheric pressure (e.g., a vacuum bag), hydrostatic pressure (e.g., a pressurized bladder), a platen press, and/or an autoclave. In one or more embodiments, the compaction pressure may be greater than the compressive strength of the open cellular core, but less than the compressive strength of the combined sacrificial mold 116 and the open cellular core.

With continued reference to the embodiment illustrated in FIG. 3, the method 200 also includes a step 300 of removing the sacrificial mold 116 from the open volume of the open cellular structure in any suitable manner, such as by dissolution of the sacrificial mold 116 in water or a solvent (e.g., 60° C. pressurized water), etching the sacrificial mold 116 in an acidic or basic bath, melting the sacrificial mold 116, and/or vaporization or combustion of the sacrificial mold 116 at a temperature greater than the consolidation temperature. Following the step 300 of removing the sacrificial mold 116, the sandwich structure includes an open cellular core defining an open (e.g., porous) volume between the two composite facesheets.

While this invention has been described in detail with particular references to embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention.

Although relative terms such as "inner," "outer," "upper," "lower," and similar terms have been used herein to describe a spatial relationship of one element to another, it is understood that these terms are intended to encompass different orientations of the various elements and components of the invention in addition to the orientation depicted in the figures. In addition, it will also be understood that when a layer is referred to as being "between" two layers, it can be the only layer between the two layers, or one or more intervening layers may also be present.

Additionally, as used herein, the term "about", "substantially," and similar terms are used as terms of approximation and not as terms of degree, and are intended to account for the inherent deviations in measured or calculated values that would be recognized by those of ordinary skill in the art. Furthermore, as used herein, when a component is referred to as being "on" or "coupled to" another component, it can be directly on or attached to the other component or intervening components may be present therebetween. Further, the use of "may" when describing embodiments of the inventive concept refers to "one or more embodiments of the inventive concept." Also, the term "exemplary" is intended to refer to an example or illustration.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

What is claimed is:

1. A method of forming a sandwich structure, the method comprising:
   at least partially filling an open volume of an open cellular core with a sacrificial mold material;
   placing the open cellular core in a chamber of a mold before at least partially filling the open volume with the sacrificial mold material;
   pressing the at least two surfaces of the open cellular core into at least one spacer positioned between the open cellular core and inner surfaces of the chamber, the at least one spacer masking the at least two surfaces of the open cellular core from contact with the sacrificial mold material;
   consolidating the sacrificial mold material to form a sacrificial mold;
   laying up a composite facesheet on each of at least two surfaces of the open cellular core; and
   co-curing the composite facesheets by applying a consolidation temperature and a compaction pressure to the composite facesheets to form the sandwich structure, wherein the compaction pressure is greater than a compressive strength of the open cellular core and less than a combined compressive strength of the open cellular core and the sacrificial mold.

2. The method of claim 1, wherein the at least one spacer comprises a material selected from the group of materials consisting of silicone, rubber, closed cell foam, a polymer film, and combinations thereof.

3. The method of claim 1, wherein the consolidation temperature is from about 23° C. to about 180° C.

4. The method of claim 1, wherein the compaction pressure is from about 0.1 MPa to about 12 MPa.

5. A method of forming a sandwich structure, the method comprising:
   at least partially filling an open volume of an open cellular core with a sacrificial mold material;
   applying a release agent to the open cellular core before at least partially filling of the open volume with the sacrificial mold material;
   masking the at least two surfaces of the open cellular core against exposure to the release agent;
   consolidating the sacrificial mold material to form a sacrificial mold;
   laying up a composite facesheet on each of at least two surfaces of the open cellular core; and
   co-curing the composite facesheets by applying a consolidation temperature and a compaction pressure to the composite facesheets to form the sandwich structure, wherein the compaction pressure is greater than a compressive strength of the open cellular core and less than a combined compressive strength of the open cellular core and the sacrificial mold.

6. The method of claim 1, wherein the at least partially filling of the open volume with the sacrificial mold material is performed by a process selected from the group of processes consisting of pouring under gravity, filling under vacuum, filling under positive pressure, sifting powder, compaction of powder, and combinations thereof.

7. The method of claim 1, wherein the sacrificial mold material is selected from the group of materials consisting of eutectic salt, plaster, polyethylene glycol (PEG), polyethylene oxide (PEO), ceramic spheres, wax, and combinations thereof.

8. The method of claim 1, wherein each of the at least two composite facesheets comprises pre-impregnated fiber reinforced polymers.

9. The method of claim 1, wherein each of the at least two composite facesheets comprises a dry fabric reinforcement layer and a liquid resin on the dry fabric reinforcement layer.

10. The method of claim 1, wherein the removing of the sacrificial mold is performed by a process selected from the group of processes consisting of burning the sacrificial mold, dissolving the sacrificial mold, etching the sacrificial mold, fracturing the sacrificial mold, evaporating the sacrificial mold, melting the sacrificial mold, and combinations thereof.

11. The method of claim 1, wherein the open cellular core comprises a plurality of struts arranged in a lattice structure.

12. The method of claim 11, wherein each strut of the plurality of struts has a solid cross-section or a hollow cross-section.

13. The method of claim 1, wherein each strut of the plurality of struts is a photopolymer waveguide.

14. The method of claim 1, wherein the open cellular core comprises foam.

15. The method of claim 1, wherein the open cellular core comprises a partially connected honeycomb structure or a grid architecture.

* * * * *